(12) United States Patent
Song

(10) Patent No.: US 12,181,776 B2
(45) Date of Patent: Dec. 31, 2024

(54) RAIL ASSEMBLY APPLIED TO OPTICAL ACTUATOR, MANUFACTURING METHOD THEREOF AND INSERT RAIL STRUCTURE APPLIED TO OPTICAL ACTUATOR

(71) Applicant: SM TECH CO., LTD, Hwaseong-si (KR)

(72) Inventor: Jaihyun Song, Hwaseong-si (KR)

(73) Assignee: SM TECH CO., LTD, Hwaseong-si (KR)

( * ) Notice: Subject to any disclaimer, the term of this patent is extended or adjusted under 35 U.S.C. 154(b) by 0 days.

(21) Appl. No.: 18/636,233

(22) Filed: Apr. 15, 2024

(65) Prior Publication Data
US 2024/0345455 A1     Oct. 17, 2024

(30) Foreign Application Priority Data
Apr. 17, 2023   (KR) .................. 10-2023-0050288

(51) Int. Cl.
*G03B 13/36*   (2021.01)
*G03B 3/02*    (2021.01)
*G03B 13/18*   (2021.01)

(52) U.S. Cl.
CPC .............. *G03B 13/36* (2013.01); *G03B 3/02* (2013.01); *G03B 13/18* (2013.01); *G03B 2217/002* (2013.01)

(58) Field of Classification Search
CPC .......... G03B 13/36; G03B 3/02; G03B 13/18; G03B 2217/002; G03B 30/00; G03B 2205/0046; G03B 2205/0069; G03B 2205/0053; G03B 2205/0007; G03B 17/12; G03B 13/32; G03B 2205/0015; G03B 5/04; H04N 23/687; H04N 23/55;
(Continued)

(56) References Cited

U.S. PATENT DOCUMENTS

| | | | |
|---|---|---|---|
| 2009/0067070 A1* | 3/2009 | Mitani | G02B 7/02 359/824 |
| 2015/0144278 A1* | 5/2015 | Lin | B60J 1/2052 160/368.1 |

(Continued)

FOREIGN PATENT DOCUMENTS

| | | |
|---|---|---|
| CN | 217355231 U | 9/2022 |
| KR | 10-2018-0128674 A | 12/2018 |

(Continued)

*Primary Examiner* — Abdelaaziz Tissire
(74) *Attorney, Agent, or Firm* — Revolution IP, PLLC

(57) ABSTRACT

Disclosed is a rail assembly applied to an optical actuator including a base and a carrier provided to be movable in an optical axis direction with respect to the base through a ball. The rail assembly includes a guide groove structure provided on at least one of the base and the carrier, formed of a synthetic resin, and configured to define a guide groove extending extend long in the optical axis direction, and an insert rail formed of a metal and installed in the guide groove. The insert rail includes a rail main body extending long in the optical axis direction along the guide groove, insert molded into the guide groove structure, and having at least one contact surface coming into contact with the ball, and at least one protrusion protruding from a side surface of the rail main body and embedded in the guide groove structure.

4 Claims, 15 Drawing Sheets

(58) Field of Classification Search
CPC .......... H04N 23/54; H04N 23/57; G02B 7/09; G02B 7/021; G02B 7/04; G02B 7/022; G02B 7/023; G02B 7/10; G02B 1/041; G02B 7/003
See application file for complete search history.

(56) References Cited

U.S. PATENT DOCUMENTS

| | | | |
|---|---|---|---|
| 2021/0373278 A1* | 12/2021 | Kim | G02B 27/646 |
| 2023/0161229 A1* | 5/2023 | Kim | H04N 23/57 |
| | | | 359/824 |
| 2023/0236385 A1* | 7/2023 | Park | G02B 7/08 |
| | | | 359/823 |
| 2023/0350274 A1* | 11/2023 | Jung | G03B 17/12 |
| 2024/0329360 A1* | 10/2024 | Osaka | H04N 23/55 |

FOREIGN PATENT DOCUMENTS

| | | |
|---|---|---|
| KR | 10-2020-0073096 A | 6/2020 |
| KR | 10-2021-0004196 A | 1/2021 |
| KR | 10-2303499 B1 | 9/2021 |
| KR | 10-2022-0019491 A | 2/2022 |

* cited by examiner

RAIL ASSEMBLY APPLIED TO OPTICAL ACTUATOR, MANUFACTURING METHOD THEREOF AND INSERT RAIL STRUCTURE APPLIED TO OPTICAL ACTUATOR

BACKGROUND OF THE INVENTION

Field of the Invention

The present invention relates to a rail assembly applied to an optical actuator implementing an autofocus function, a manufacturing method thereof, and an insert rail structure applied to the optical actuator.

Description of the Related Art

Optical modules such as small cameras are often installed as basic items in portable electronic devices, such as smartphones and tablet and notebook computers, drones, vehicles, and the like. An actuator which may implement an autofocus (AF) function to adjust a focal distance with a subject by linearly moving a lens in an optical axis direction is applied as these optical modules.

Korean Patent Registration No. 10-2303499 (hereinafter referred to as "Related Patent 1") discloses an "optical actuator". According to Related Patent 1, a magnet (or a coil) is installed on a carrier which is a moving body equipped with a lens, a coil (or a magnet) is installed on a housing which is a fixed body, and an electromagnetic force is generated between the coil and the magnet to move the carrier in a direction of an optical axis or in a direction perpendicular to the optical axis. In addition, an appropriate distance between the moving body and the fixed body may be continuously maintained by interposing balls between the moving body and the fixed body, and the carrier may be more flexibly and accurately moved due to frictional force minimized through rotational movement of the balls and point contact with the balls.

Such a camera module is bound to increase in size and weight as camera performance becomes more advanced and sophisticated.

However, in the case of Related Patent 1, whenever the autofocus function or the like is implemented, the carrier moves a very short distance at a high speed while maintaining contact with ball bearings, and may receive a strong external shock such as falling, and when the carrier is formed of a synthetic resin, a dent is formed on the surface of the carrier facing the ball bearing due to surface hardness depending on material characteristics, thereby causing problems, such as deterioration of the autofocus function.

Chinese Patent Publication No. CN217355231U (hereinafter referred to as "Related Patent 2") discloses an "optical guide rail structure". According to Related Patent 2, the optical guide rail structure includes a plastic rail seat, a metal insert guide rail and a sliding member, a sliding groove in which a ball, i.e., a sliding member, is movable is formed in the plastic rail seat, and the metal insert guide rail is correspondingly and fittingly embedded on the wall surface of the sliding groove. The ball is positioned in the sliding groove and is pressed against the surface of the metal insert guide rail. The metal insert guide rail is formed integrally with the plastic rail seat by injection molding.

However, in the case of Related Patent 2, since the opposing contact surfaces of the plastic rail seat and the metal insert guide rail are flat, the plastic rail seat and the metal insert guide rail may not maintain sufficiently firm coupling, and thus, the metal insert guide rail may be easily separated from the plastic rail seat.

RELATED ART DOCUMENTS

Patent Documents (Patent Document 1) Korean Patent Registration No. 10-2303499

(Patent Document 2) Chinese Patent Publication No. CN217355231U

SUMMARY OF THE INVENTION

Therefore, the present invention has been made in view of the above problems, and it is an object of the present invention to provide a rail assembly applied to an optical actuator, which may have an extended lifespan by preventing separation of an insert rail formed of a metal having contact surfaces configured to guide movement of balls, a manufacturing method thereof, and an insert rail structure applied to the optical actuator.

It is another object of the present invention to provide a rail assembly applied to an optical actuator, which may be manufactured by an automated production system, and a manufacturing method thereof.

In accordance with one aspect of the present invention, the above and other objects can be accomplished by the provision of a rail assembly applied to an optical actuator including a base and a carrier provided to be movable in an optical axis direction with respect to the base through a ball. The rail assembly includes a guide groove structure provided on at least one of the base and the carrier, formed of a synthetic resin, and configured to define a guide groove configured to extend long in the optical axis direction, and an insert rail formed of a metal and installed in the guide groove to guide movement of the ball. The insert rail includes a rail main body configured to extend long in the optical axis direction along the guide groove, insert molded into the guide groove structure, and having at least one contact surface configured to come into contact with the ball, and at least one protrusion configured to protrude from a side surface of the rail main body and embedded in the guide groove structure.

The rail main body may include a first contact surface part and a second contact surface part formed by bending the rail main body with respect to a predetermined reference line configured to extend in the optical axis direction, and configured to come into contact with the ball on both sides of the reference line.

At least one opening may be formed in the rail main body along the reference line.

The at least one opening may be embedded in the guide groove structure.

The guide groove structure may include an insert fixing part configured to connect the first contact surface part and the second contact surface part within the guide groove.

Alternatively, the guide groove structure may include a bottom surface configured to form a bottom of the guide groove, and a first side surface part and a second side surface part configured to extend from both sides of the bottom surface so as to define the guide groove together with the bottom surface. In addition, the insert rail may be embedded in the bottom surface so that the at least one contact surface of the insert rail is exposed to come into contact with the ball.

In accordance with another aspect of the present invention, there is provided a manufacturing method of the rail assembly including producing a metal insert member comprising the insert rail, a jig, and a connection bridge configured to connect the insert rail and the jig by press forming, forming the guide groove structure provided with the insert rail inserted thereinto by placing the insert rail in an injection mold using the jig and then performing injection molding, and separating the connection bridge from the insert rail.

In accordance with yet another aspect of the present invention, there is provided an insert rail structure formed of a metal and applied to an optical actuator including a base and a carrier provided to be movable in an optical axis direction with respect to the base through a ball, and configured such that a guide groove structure formed of a synthetic resin and configured to define a guide groove configured to extend long in the optical axis direction is provided on at least one of the base and the carrier. The insert rail structure includes a rail main body configured to extend long in the optical axis direction along the guide groove, insert molded into the guide groove structure, and having at least one contact surface configured to come into contact with the ball, at least one protrusion configured to protrude from a side surface of the rail main body and embedded in the guide groove structure, and a connection bridge configured to the rail main body to a jig.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, technical ideas described in embodiments of the present invention may be implemented independently or in combination with each other. Reference will now be made in detail to various embodiments of the present invention, examples of which are illustrated in the accompanying drawings and described below. While the invention will be described in conjunction with exemplary embodiments, it will be understood that present description is not intended to limit the invention to the exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
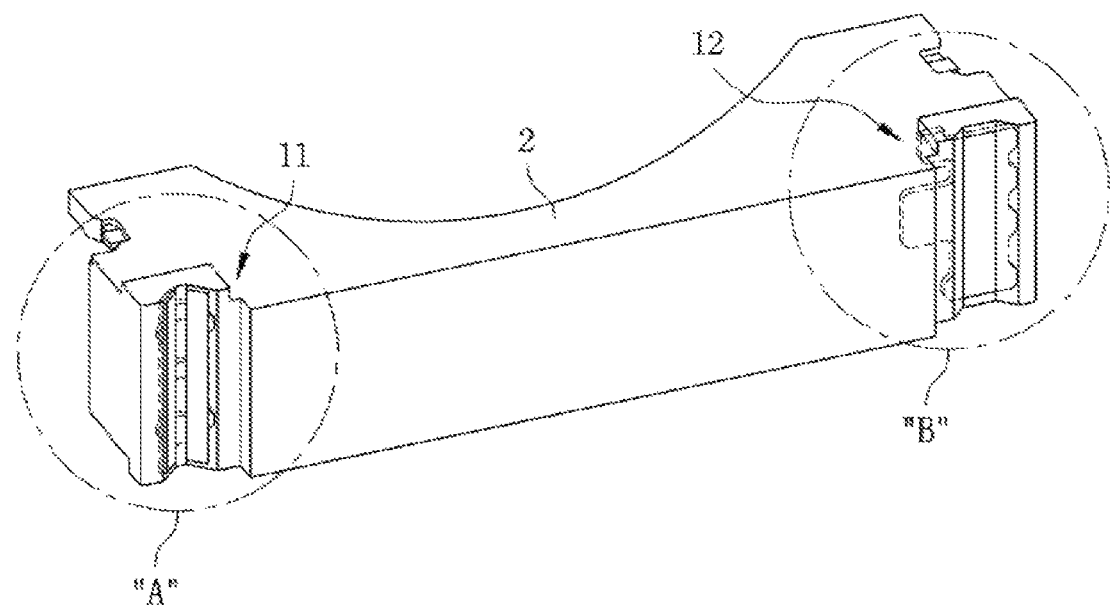
FIG. 1 is a perspective view showing rail assemblies applied to an optical actuator according to one embodiment of the present invention, and specifically provided on a carrier.
Figure 2:
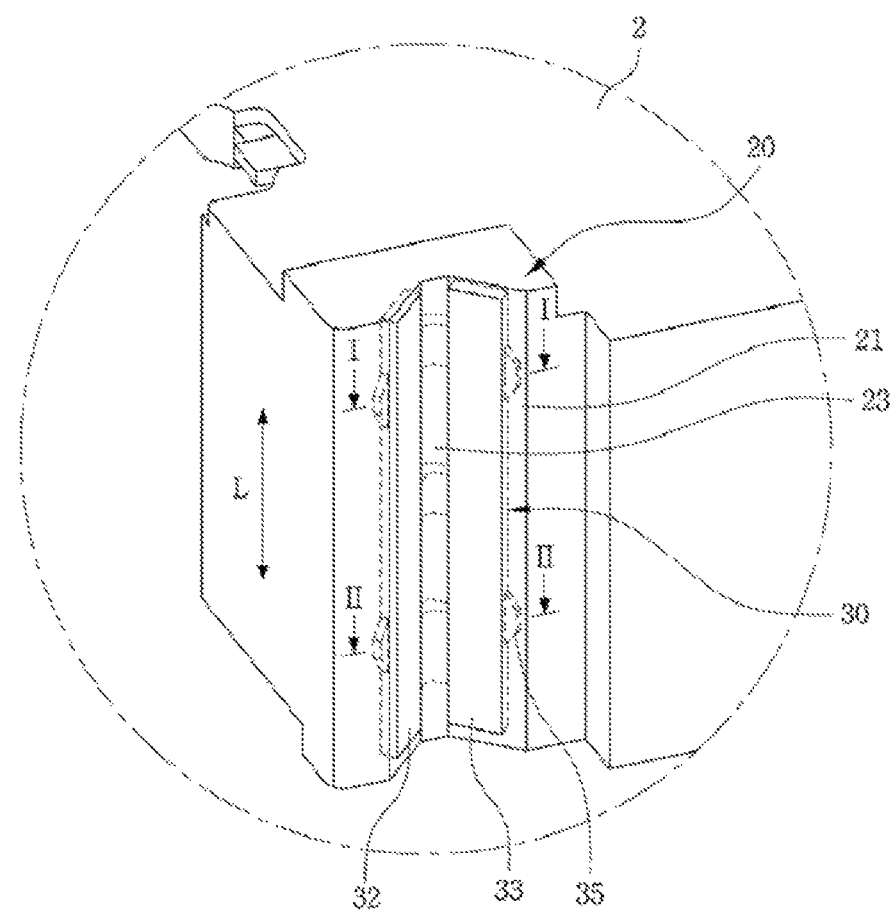
FIG. 2 is an enlarged view of portion "A" shown in FIG. 1, showing a first rail assembly.
Figure 3:
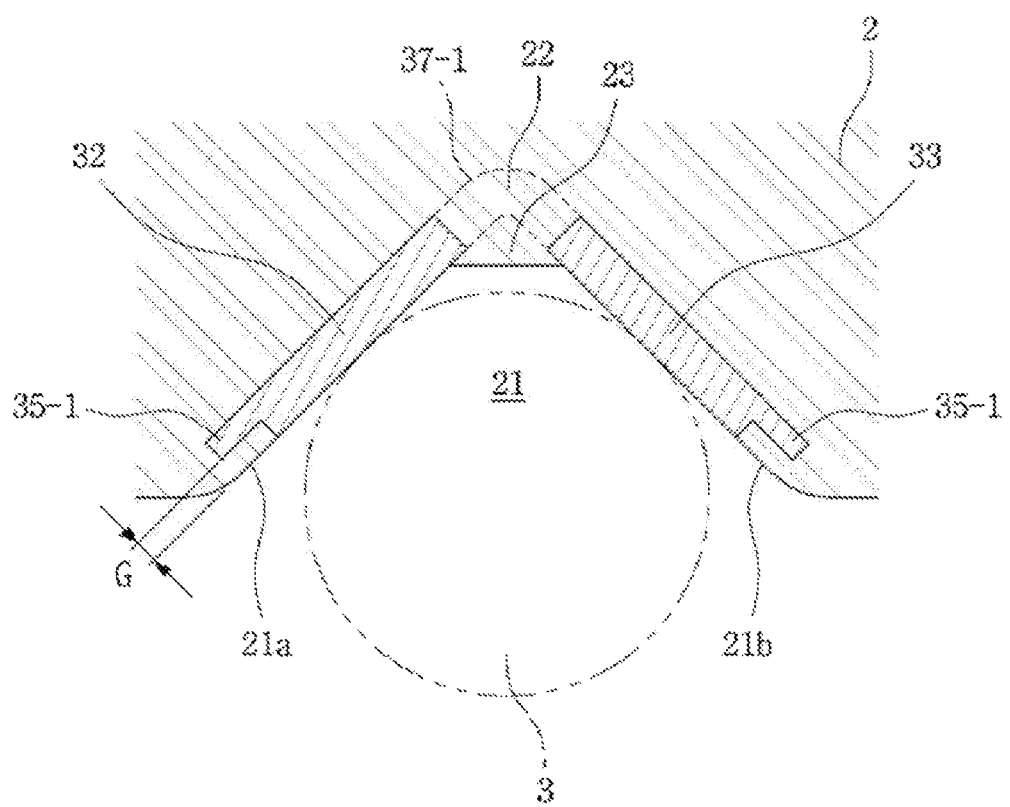
FIG. 3 is a cross-sectional view taken along line "I-I" shown in FIG. 2.
Figure 4:
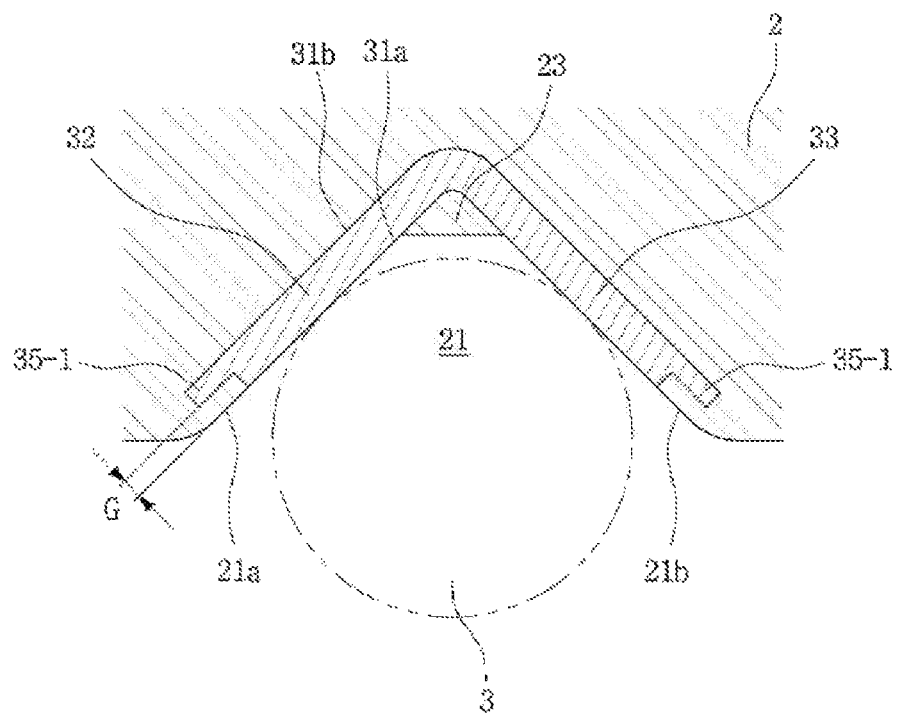
FIG. 4 is a cross-sectional view taken along line "II-II" shown in FIG. 2.
Figure 5:
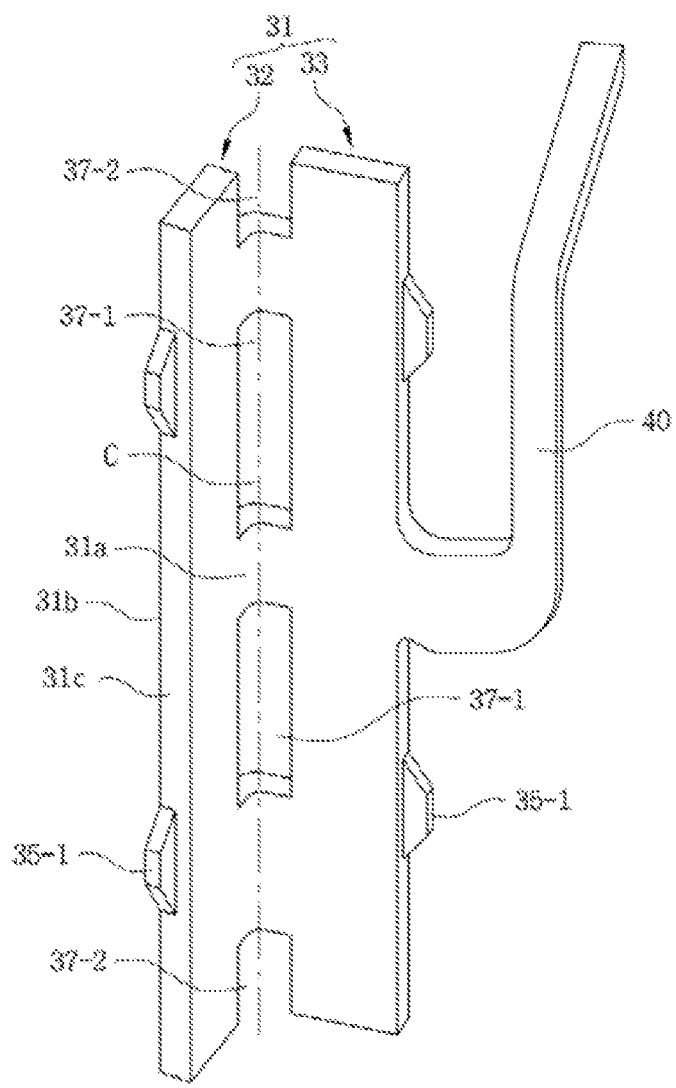
FIG. 5 is a perspective view showing a first insert rail shown in FIG. 2.
Figure 10:
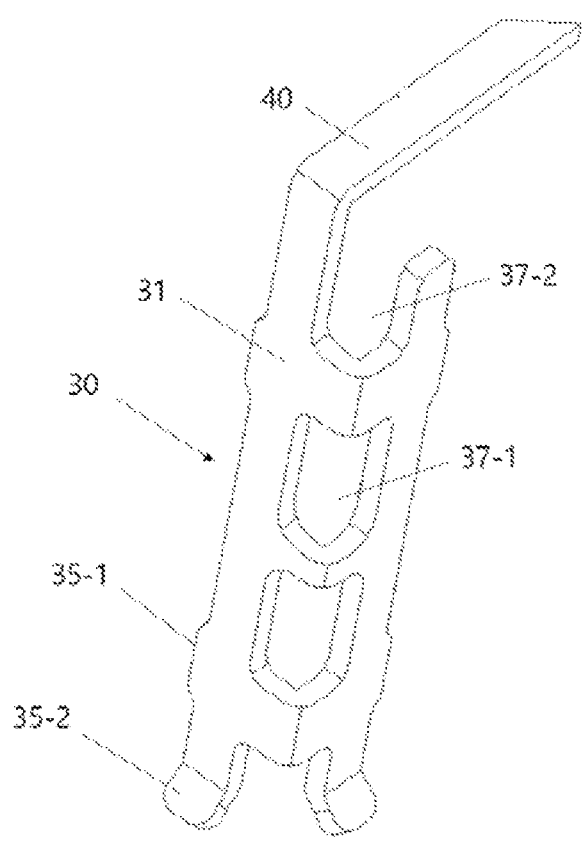
Figure 11:
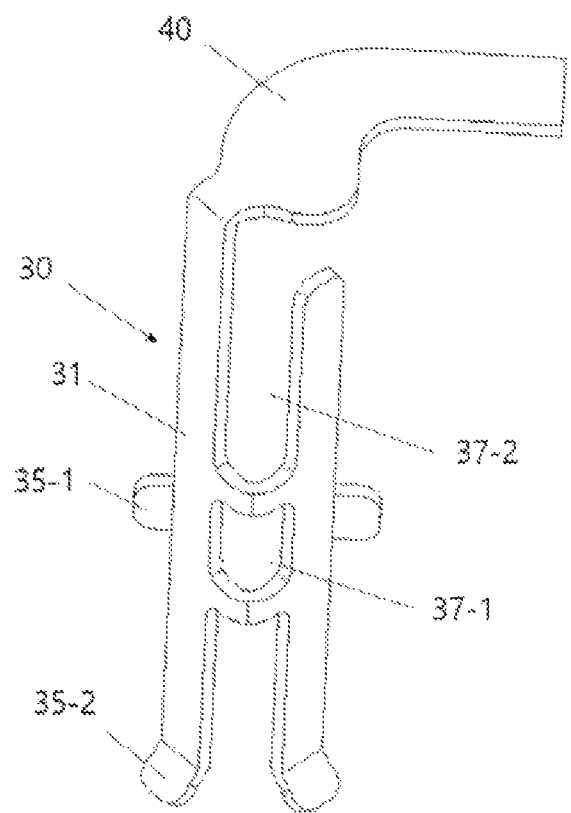
Figure 12:
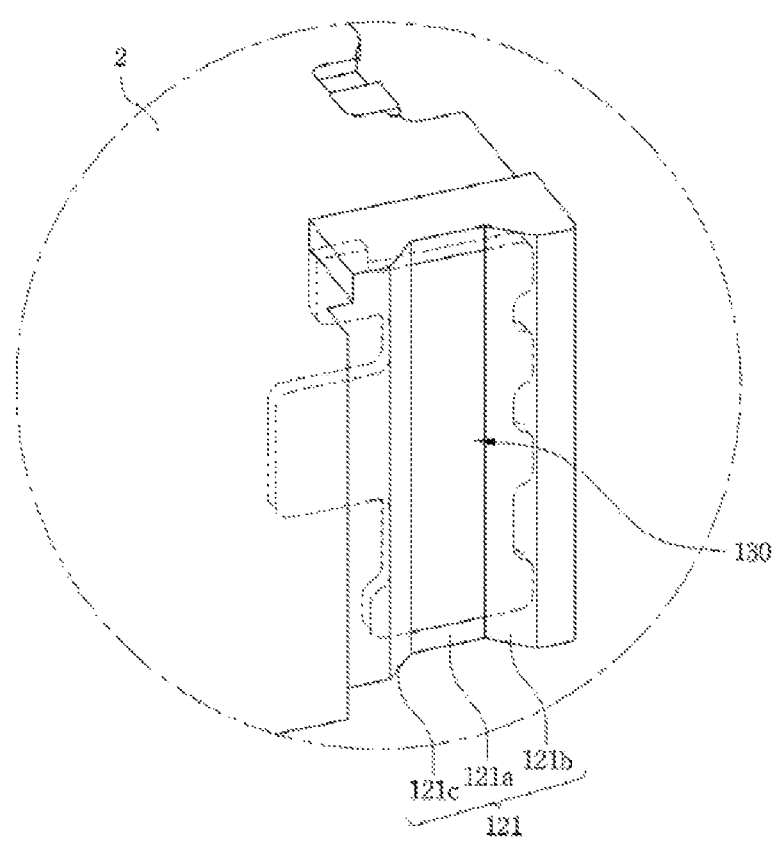
FIG. 12 is an enlarged view of portion "B" shown in FIG. 1, showing a second rail assembly.
Figure 13:
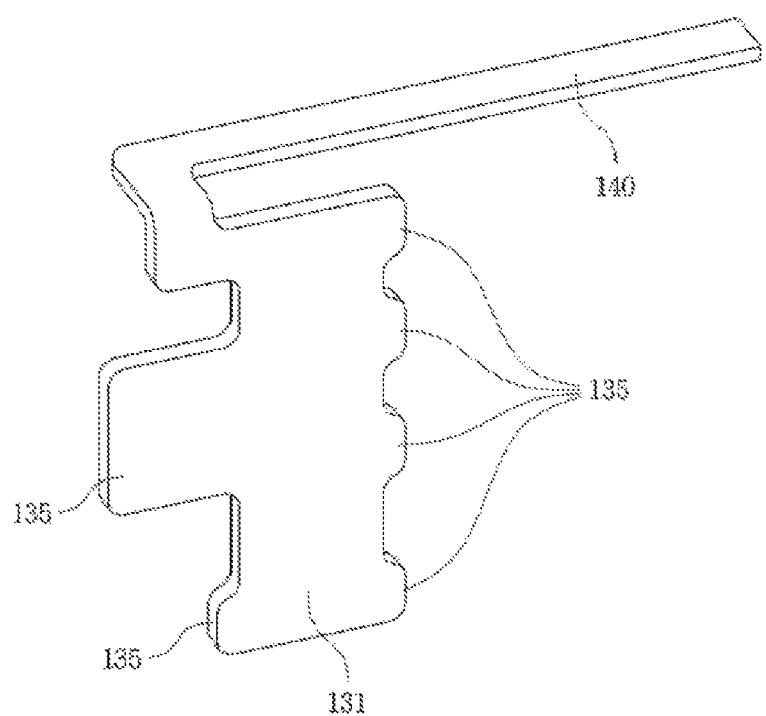
FIG. 13 is a perspective view showing a second insert rail shown in FIG. 12.
Figure 14:
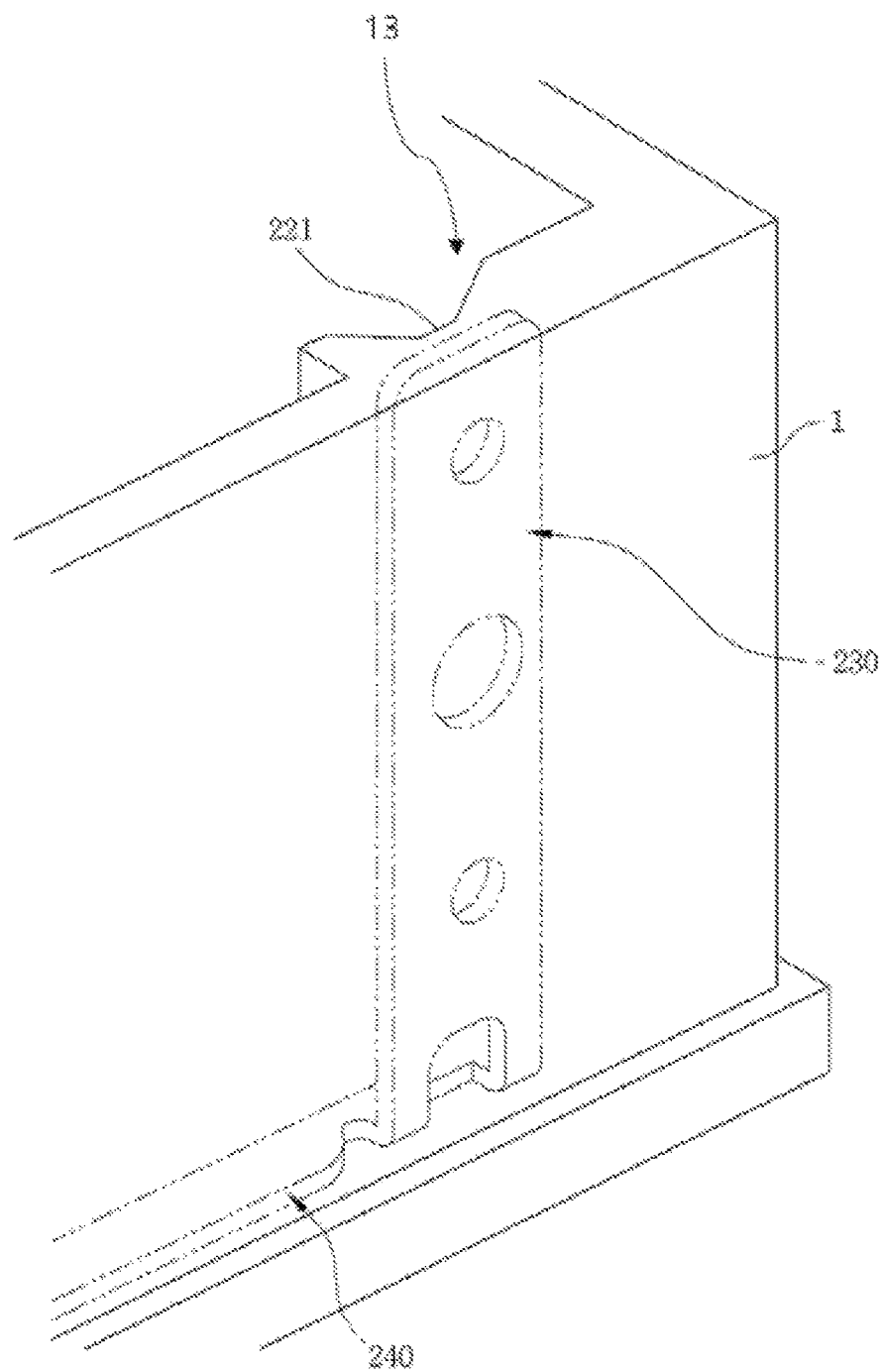
FIG. 14 is a perspective view showing a third rail assembly applied to an optical actuator according to another embodiment of the present invention, and specifically provided on a base.
Figure 15:
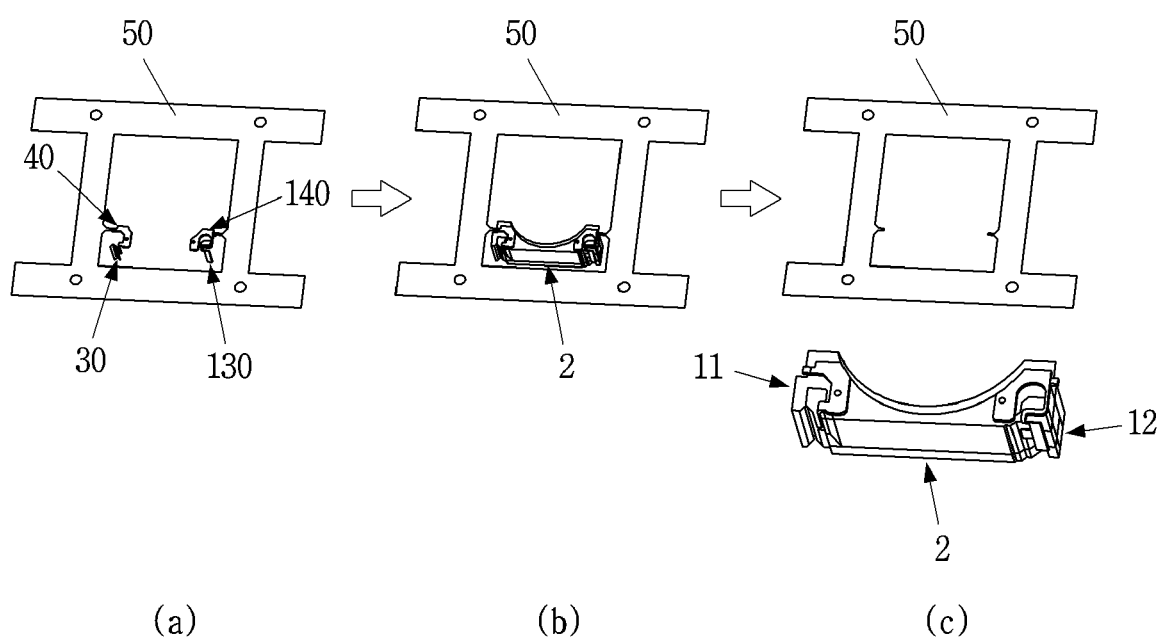
FIG. 15 shows a process of manufacturing rail assemblies applied to an optical actuator according to the present invention.

FIG. 1 is a perspective view showing rail assemblies applied to an optical actuator according to one embodiment of the present invention and provided on a carrier, FIG. 2 is an enlarged view of portion "A" shown in FIG. 1, showing a first rail assembly, FIG. 3 is a cross-sectional view taken along line "I-I" shown in FIG. 2, FIG. 4 is a cross-sectional view taken along line "II-II" shown in FIG. 2, FIG. 5 is a perspective view showing a first insert rail shown in FIG. 2, FIGS. 6 to 11 are perspective views showing other embodiments of the first insert rail, FIG. 12 is an enlarged view of portion "B" shown in FIG. 1, showing a second rail assembly, FIG. 13 is a perspective view showing a second insert rail shown in FIG. 12, FIG. 14 is a perspective view showing a third rail assembly applied to an optical actuator according to another embodiment of the present invention and provided on a base, and FIGS. 15(a) to 15(c) are views showing a process of manufacturing rail assemblies applied to an optical actuator according to the present invention.

An optical actuator, to which a rail assembly according to one embodiment of the present invention is applied, as referred to in the above-described related art, includes a base 1, and a carrier 2 provided to be movable in an optical axis direction (shown by arrow L) with respect to the base 1 through balls 3, and rail assemblies 11, 12 and 13 are provided on at least one of the base 1 and the carrier 2. One rail assembly or a plurality of rail assemblies 11, 12 and 13 may be provided on the base 1 and/or the carrier 2. Further, the rail assemblies 11, 12 and 13 having different detailed implementation structures may be applied depending on which of the base 1 and the carrier 2 the rail assemblies 11, 12 and 13 are provided, or a contact direction with the balls 3.

Hereinafter, a case in which the first rail assembly 11 and the second rail assembly 12 are provided on the carrier 12 and the third rail assembly 13 is provided on the base 1 depending on the detailed implementation structures of the rail assemblies 11, 12 and 13 will be explained as an example, but the present invention is not limited thereto, and of course, the rail assembly of the present invention may be implemented in various ways depending on the size of the optical actuator to which the rail assembly is applied.

First, referring to FIGS. 2 to 11, the first rail assembly 11 may be provided on one side of the carrier 2, and includes a first guide structure 20 configured to define a first guide groove 21 extending long in the optical axis direction (shown by arrow L), and a first insert rail 30 installed in the first guide groove 21 to guide (rolling) movement of the ball 3 during movement of the carrier 2. Particularly, the first guide groove structure 20 together with the carrier 2, is formed of a synthetic resin, and the first insert rail 30 is formed of a metal having superior surface hardness to the synthetic resin so as not to form dents in the first insert rail 30 coming into contact with the ball 3 during high-speed movement of the carrier 2.

The first guide groove structure 20 may be formed integrally with the carrier 2 through injection molding, or may be formed through injection molding separately from the carrier 2 and then combined with the carrier 2.

The first insert rail 30 includes a first rail main body 31 which extends long in the optical axis direction (shown by arrow L) along the first guide groove 21, is insert molded in the first guide groove structure 20, and has at least one contact surface coming into contact with the ball 3. That is, the first rail main body 31 may be embedded in the first guide groove structure 20 in the state in which a front surface 31a configured to form the contact surface is exposed.

Here, the first rail main body 31 may be embedded to a depth corresponding to the thickness of the first rail main body 31 so that the front surface 31a of the first rail main body 31 is smoothly connected to inner surfaces 21a and 21b, which define the first guide groove 21, without steps, but the embedment depth of the first rail main body 31 is not limited thereto and may be smaller or larger than the thickness of the first rail main body 31.

A rear surface 31b of the first rail main body 31 facing the first guide groove structure 20 may be formed as a flat surface together with the front surface 31a of the the first rail main body 31, but the rear surface 31b of the first rail main body 31 is not limited thereto and may be formed as an uneven surface to improve coupling force to the first guide groove structure 20.

The first insert rail 30 formed of a metal and the first guide groove structure 20 formed of a synthetic resin may be easily and reliably coupled to each other by the above insert molding method.

In addition, the first insert rail 30 may further include at least one first protrusion 35-1 or 35-2 which protrudes from each of side surfaces 31c of the first rail main body 31 and is embedded in the first guide groove structure 20. The first insert rail 30 may be firmly coupled to the first guide groove structure 20 and separation of the first insert rail 30 from the first guide groove structure 20 may be restricted by the first protrusions 35-1 and 35-2 embedded in the first guide groove structure 20.

A plurality of first protrusions 35-1 or 35-2 may be provided to be spaced apart from each other along each of the side surfaces 31c of the first rail main body 31. For example, referring to FIGS. 5 to 8, a plurality of first protrusions 35-1 may be provided on each of a first side surface and a second side surface of the first rail main body 31 facing in a direction intersecting the optical axis direction (shown by arrow L). Alternatively, referring to FIGS. 9 to 11, the first protrusion 35-2 may be provided on at least one of a third side surface and a fourth side surface of the first rail main body 31 facing each other in the direction intersecting the optical axis direction (shown by arrow L).

Figure 9:
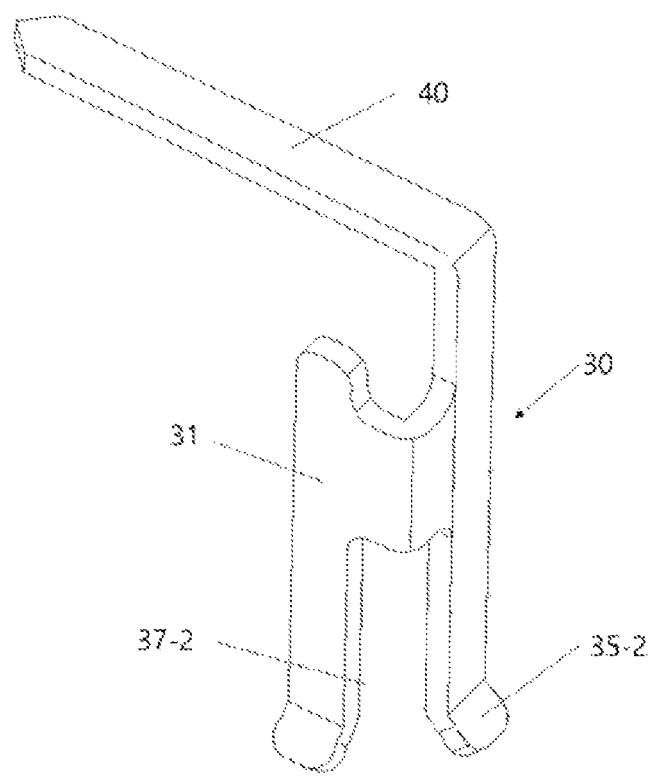

Further, referring to FIGS. 5 to 8, the first protrusions 35-1 may protrude a predetermined length in a direction perpendicular to the corresponding side surface of the first rail main body 31. The first protrusions 35-1 may have various shapes, such as a square, an arc, a trapezoid, and the like. Alternatively, as shown in FIGS. 9 to 11, the first protrusion 35-2 may protrude in a direction inclined at a predetermined angle from a direction perpendicular to the corresponding side surface of the first rail main body 31. That is, the first protrusion 35-2 may be bent with respect to the first rail main body 31.

In addition, referring to FIGS. 5 to 8, the first protrusions 35-1 are provided to be spaced apart from the front surface 31a of the first rail main body 31 toward the rear surface 31b by a designated gap G, and may thus be completely embedded in the first guide groove structure 20 without being exposed from the first guide groove structure 20. Alternatively, referring to FIGS. 9 to 11, the first protrusion 35-2 may be provided corresponding to the thickness of the first rail main body 31 as long as the first protrusion 35-2 may be completely embedded in the first guide groove structure 20.

The first rail main body 31 may include a first contact surface part 32 and a second contact surface part 33 formed by bending the first rail main body 31 with respect to a predetermined reference line C extending in the optical axis direction (shown by arrow L), and configured to come into contact with the ball 3 on both sides of the reference line C. The first contact surface part 32 and the second contact surface part 33 are disposed in directions inclined at a predetermined angle with respect to the reference line C, and the distance between the first contact surface part 32 and the second contact surface part 33 may be decreased as the first contact surface part 32 and the second contact surface part 33 get closer to the bottom of the first guide groove 21. For example, the first rail main body 31 may be bent in a V shape with respect to the reference line C so that the first contact surface part 32 and the second contact surface part 33 may be connected to each other at the reference line C. The first guide groove 21 may be formed corresponding to the first rail main body 31 of such a bent structure. That is, the first guide groove 21 may also be formed as a V-shaped groove.

At least one first opening 37-1 and 37-2 may be formed in the first rail main body 31 having the bent structure along the reference line C. The first openings 37-1 and 37-2 are holes penetrating the first rail main body 31 in a direction connecting the front surface 31a and the rear surface 31b of the first rail main body 31, and the cross-sections of the first openings 37-1 and 37-2 may have various shapes, such as a square, a circle, an oval, a heart, and a trapezoid, as shown in FIGS. 5 to 11.

The first openings 37-1 and 37-2 may also be embedded in the first guide groove structure 20, and parts of the inner surfaces 21a and 21b defining the first guide groove 21, which correspond to the first openings 37-1 and 37-2, may serve as first fitting parts 22 which protrude relative to other parts and are fit into the first openings 37-1 and 37-2. The first insert rail 30 may be more firmly coupled to the first guide groove structure 20 by such a fitting combination structure between the first fitting parts 22 and the first openings 37-1 and 37-2.

The first openings 37-2 provided at the ends of the first rail main body 31 along the reference line C are formed such that one side of each of the first openings 37-2 corresponding to the end of the first rail main body 31 is open along the reference line C, thereby allowing a first insert fixing part 23 to be easily molded without defects, as will be described later, and improving structural stability of the first insert fixing part 23.

The first guide groove structure 20 may further include the first insert fixing part 23 provided in the first guide groove 21 to connect the first contact surface part 32 and the second contact surface part 33.

The first insert fixing part 23 may be provided to be spaced apart from the ball 3 by a designated distance toward the corner part of the first insert main body 31, in which the first contact surface part 32 and the second contact surface part 33 are connected and the first openings 37-1 and 37-2 are provided, in the depth direction of the first guide groove 21 so as not to contact the ball 3. Therefore, the first rail main body 31 may be embedded in the state in which the corner part thereof is covered with the first insert fixing part 23, and thereby, separation of the first insert rail 30 from the first guide groove structure 20 may be restricted, and stability and durability of the overall structure of the first rail assembly 11 may be improved.

The first insert fixing part 23 may extend long in the optical axis direction (shown by arrow L) so that both ends thereof may be connected to the inner surfaces 21a and 21b defining the first guide groove 21, and thus, the first insert fixing part 23 may be integrated with the first guide groove structure 20 in a continuous state.

The first insert fixing part 23 may be formed to extend to the above-described corner part of the first rail main body 31 in the depth direction of the first guide groove 21. Therefore, the first insert fixing part 23 is connected to the first fitting parts 22 into one body through the first openings 37-1 and 37-2, and thus, separation of the first insert fixing part 23 may be more reliably prevented and coupling of the first insert rail 30 to the first guide groove structure 20 may be stably maintained. In addition, since, when injection molding is performed to produce the first guide groove structure 20, the first guide groove structure 20 may be formed by delivering a synthetic resin material through the first openings 37-1 and 37-2, the first guide groove structure 20 extending long in the optical axis direction (shown by arrow L) may be easily formed without defects, and the first guide groove structure 20 may be produced by injection molding using an automated production system. Particularly, the first openings 37-1 and 37-2 may be basically provided along the reference line C in the central part of the first rail main body 31 so that the central part of the first insert fixing part 23 extending long in the optical axis direction (shown by arrow L) may be formed without an unmolded portion.

Meanwhile, the first rail assembly 11 which is finally completed may have the first insert rail 30 provided in an independent structure separated from a first connection bridge 40 which connects the first insert rail 30 to a jig 50 during insert molding. Alternatively, the first rail assembly 11 may a first insert rail forming structure in which the first insert rail 30 is connected to the first connection bridge 40.

Figure 6:
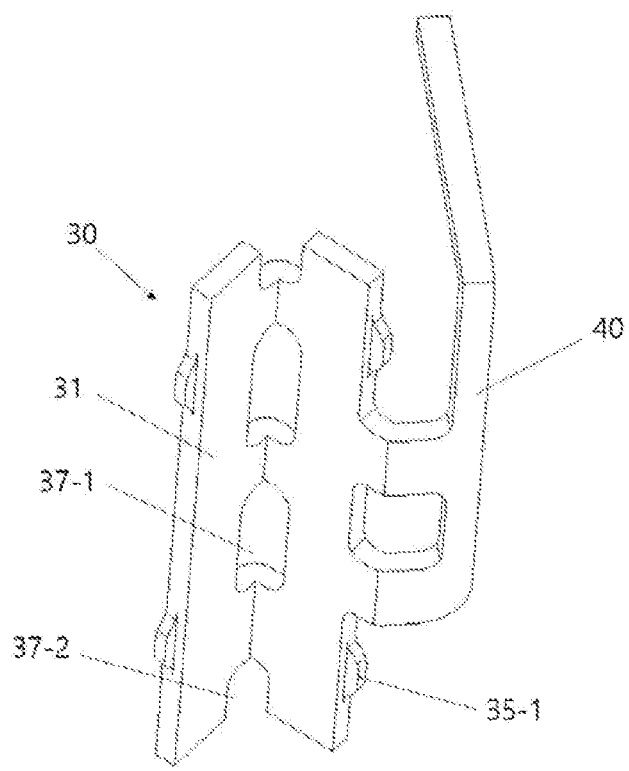
FIGS. 6 to 11 are perspective views showing other embodiments of the first insert rail.
Figure 7:
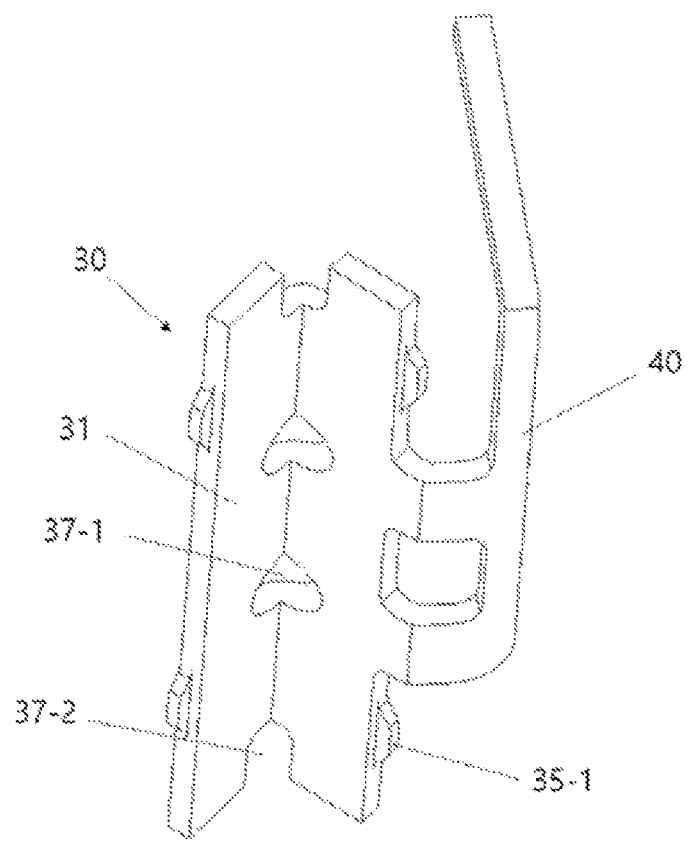
Figure 8:
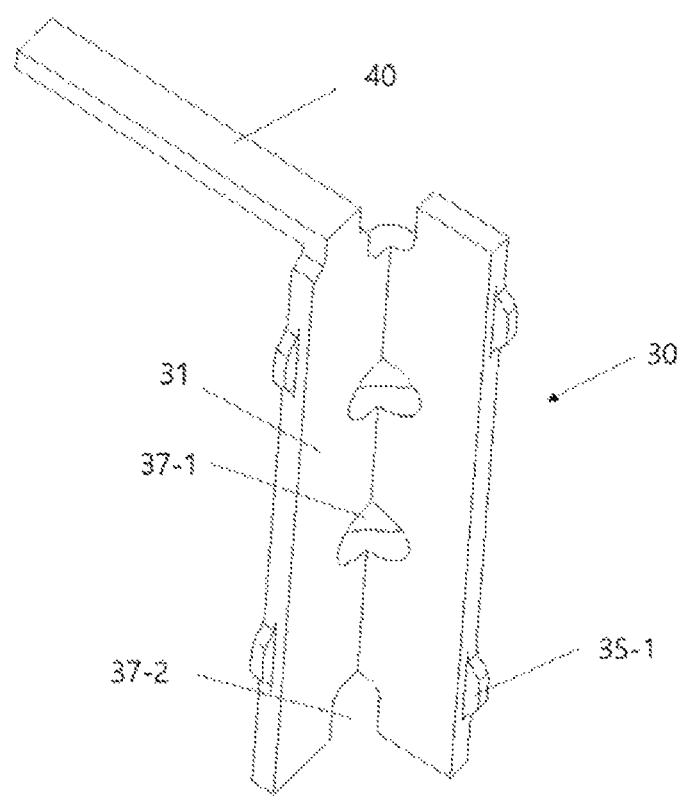

The first connection bridge 40 may be provided similarly to the form of a runner of an injection mold. The first connection bridge 40 may be connected to at least one of the first side surface and the second side surface of the first rail main body 31, as shown in FIGS. 5 to 7, or may be connected to at least one of the third side surface and the fourth side surface of the first rail main body 31, as shown in FIGS. 8 to 11. The first connection bridge 40 may be provided in the form of a bar which is straight or bent at least once, or may be provided in the form of a panel having a designated shape.

Next, referring to FIGS. 12 and 13, the second rail assembly 12 is provided on the other side of the carrier 2, and may include a second guide groove structure formed of a synthetic resin and configured to define a second guide groove 121, and a second insert rail 130 formed of a metal, in the same manner as the first rail assembly 11, and a description of elements of the second rail assembly 12 which are substantially the same as those of the first rail assembly 11 will be omitted below.

The second guide groove structure may include a bottom surface 121a configured to form the bottom of the second guide groove 121, and a first side surface part 121b and a second side surface part 121c extending from both sides of the bottom surface 121a to define the second guide groove 121 together with the bottom surface 121a. The bottom surface 121a is formed as a flat surface. The first side surface part 121b and the second side surface part 121c are formed as surfaces inclined at a designated angle with respect to the depth direction of the second guide groove 121, and the distance between the first side surface part 121b and the second side surface part 121c may be gradually decreased as the first side surface part 121b and the second side surface part 121c get closer to the bottom surface 121a.

The second insert rail 130 may include a second rail main body 131 embedded in the bottom surface 121a of the second guide groove 121 and exposed so that a contact surface of the second rail main body 131 comes into contact with a ball 3, and second protrusions 135 protruding from the side surfaces of the second rail main body 131 to be completely embedded in the second guide groove structure 120.

The second rail main body 131 may be formed as a flat plate corresponding to the bottom surface 121a of the second guide groove 121.

In a finally finished product state, the second insert rail 130 may be applied as an independent structure separated from a second connection bridge 140, or may be applied as a second insert rail forming structure in which the second insert rail 130 is integrally connected to the second connection bridge 140.

The second rail assembly 12 may be formed without structures corresponding to the first openings 37-1 and 37-2 and the first insert fixing part 23.

Next, referring to FIG. 14, the third rail assembly 13 is provided on the base 1, and may include a third guide groove structure formed of a synthetic resin and configured to form a third guide groove 221 and a third insert rail 230 formed of a metal, in the same manner as the first rail assembly 11 and the second rail assembly 12. Hereinafter, a description of elements of the third rail assembly 13 which are substantially the same as those of the first rail assembly 11 and the second rail assembly 12 will be omitted.

The third guide groove structure may define the third guide groove 221 corresponding to the second guide groove 121, and the third insert rail 230 may include a third rail main body embedded in the bottom surface of the third guide groove 221 and formed as a flat surface coming into contact with a ball (not shown). The third insert rail 230 may include only the third rail main body without structures corresponding to the first protrusions 35-1 and 35-2 and the second protrusions 135.

The third insert rail 230 may be applied as a third insert rail forming structure in which the third insert rail 230 is integrally connected to a third connection bridge 240 after insert molding. Particularly, the third connection bridge 240 may protrude in the vertical direction from any one of both side surfaces of the third rail main body facing in a direction intersecting the optical axis direction and may be embedded in the third guide groove structure, and therefore, the third rail assembly 13 may be configured such that separation of the third insert rail 230 is restricted by the third connection bridge 240 even without having third protrusions corresponding to the third protrusions 35-1 and 35-2 and the second protrusions 135.

A manufacturing method of the above-described rail assemblies applied to the optical actuator according to the present invention will be described in detail as follows.

As shown in FIG. 15(a), in step (1), metal insert members are produced by press forming. Each of the metal insert members includes the insert rail 30 or 130 of the above-described rail assembly 11 or 12, the jig 50, and the connection bridge 40 or 140 configured to connect the insert rail 30 or 130 and the jig 50.

The jig 50 is detachably coupled to an injection mold when injection molding to produce the first and second guide groove structures formed of the synthetic resin integrally with the carrier 2, and support the insert rails 30 and 130 so that the insert rails 30 and 130 are positioned in place within the injection mold. The jig 50 may have various shapes depending on the structure of the injection mold.

Further, a plurality of insert rails 30 and 130 together with connection bridges 40 and 140 thereof may be formed on one jig 50 by press forming.

As shown in FIG. 5(*b*), in step (2), the guide groove structures into which the insert rails 30 and 130 are inserted are formed by placing the insert rails 30 and 130 in the injection mold using the jig 50 and then performing injection molding with the synthetic resin. The guide groove structures may be formed integrally with the base 1 or the carrier 2.

That is, the base 1 or the carrier 2 provided with the guide groove structures integrally coupled to metal insert members may be produced through injection molding by mounting the metal insert members produced in step (1) in the injection mold so that the insert rails 30 and 130 are positioned within the injection mold, and then supplying the synthetic resin to the injection mold.

As shown in FIG. 5(*c*), in step (3), the rail assemblies 11 and 12 are completed by cutting and separating unnecessary parts from the metal insert members coupled to the guide groove structures in step (2).

That is, when the insert rails 30 and 130 are applied as independent structures separated from the connection bridges 40 and 140 at the finally finished product stage, the connection bridges 40 and 140 together with the jig 50 may be separated from the insert rail assemblies 30 and 130 by cutting connection parts between the connection bridges 40 and 140 and the insert rails 30 and 130.

Alternatively, when the insert rails 30 and 130 are applied as insert rail forming structures integrally connected to the connection bridges 40 and 140 at the finally finished product stage, the jig 50 may be separated from the insert rail assemblies 30 and 130 by cutting connection parts between the jig 50 and the connection bridges 40 and 140.

As is apparent from the above description, a rail assembly applied to an optical actuator, a manufacturing method thereof, and an insert rail structure applied to the optical actuator according to the present invention exhibit the following effects.

First, a rail main body coming into contact with a ball is embedded in a guide groove structure, and at least one protrusion embedded in the guide groove structure is provided on each side surface of the rail main body, thereby exhibiting the effect of restricting separation of an insert rail from the guide groove structure due to structural interference caused by the protrusion, and thus improving the lifespan of the rail assembly.

Second, the rail main body is further provided with openings embedded in the guide groove structure, thereby exhibiting the effect of improving coupling force between the guide groove structure and the insert rail.

Third, the coupling force between the guide groove structure and the insert rail may be further improved by an insert fixing part disposed in a guide groove.

Fourth, the insert fixing part may be formed integrally with the guide groove structure by the openings, thereby exhibiting the effect of easily forming the insert fixing part extending long in the optical axis direction without defects.

Fifth, after producing a metal insert member by press forming, the guide groove structure is formed by inserting the insert rail into an injection mold using a jig, thereby exhibiting the effect of easily manufacturing the rail assembly using an automated production system.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A manufacturing method of a rail assembly which is applied to an optical actuator comprising a base and a carrier provided to be movable in an optical axis direction with respect to the base through a ball, comprising:
   producing a metal insert member by press forming, the metal insert comprising an insert rail, a jig, and a connection bridge configured to connect the insert rail and the jig;
   positioning the metal insert member in the injection mold using the jig;
   performing injection molding by supplying a synthetic resin to the injection mold to form a guide groove structure into which the insert rail is inserted, wherein the guide groove structure is integrally formed with either a base or a carrier of the optical actuator; and
   separating the connection bridge from the insert rail by cutting connection parts between the connection bridge and the insert rail, wherein, before the cutting, the connection parts are formed in the jig,
   wherein the guide groove structure and the insert rail form the rail assembly,
      the guide groove structure provided on at least one of the base and the carrier, formed of a synthetic resin, and configured to define a guide groove configured to extend long in the optical axis direction, and
      the insert rail formed of a metal and installed in the guide groove to guide movement of the ball, the insert rail comprising:
         a rail main body configured to extend long in the optical axis direction along the guide groove, insert molded into the guide groove structure, and having at least one contact surface configured to come into contact with the ball; and
         at least one protrusion configured to protrude from a side surface of the rail main body and embedded in the guide groove structure,
         wherein the rail main body comprises:
            a first contact surface part and a second contact surface part formed by bending the rail main body with respect to a predetermined reference line configured to extend in the optical axis direction, and configured to come into contact with the ball on both sides of the reference line; and
            at least one opening formed in the rail main body along the reference line.

2. The manufacturing method of claim 1, wherein the guide groove structure comprises an insert fixing part configured to connect the first contact surface part and the second contact surface part within the guide groove.

3. The manufacturing method of claim 1, wherein the guide groove structure comprises:
   a bottom surface configured to form a bottom of the guide groove; and
   a first side surface part and a second side surface part configured to extend from both sides of the bottom surface so as to define the guide groove together with the bottom surface,
   wherein the insert rail is embedded in the bottom surface so that the at least one contact surface of the insert rail is exposed to come into contact with the ball.

4. The manufacturing method of claim 1, wherein a pair of the main bodies and a pair of connection bridges are further included in the rail assembly, each main body connected to the jig by the connection bridge, respectively.

\* \* \* \* \*